April 30, 1968  F. PAPKE  3,380,336
VIEWER FOR PHOTOGRAPHIC CAMERAS
Filed Feb. 25, 1964  2 Sheets-Sheet 1

April 30, 1968     F. PAPKE     3,380,336
VIEWER FOR PHOTOGRAPHIC CAMERAS
Filed Feb. 25, 1964     2 Sheets-Sheet 2

3,380,336
VIEWER FOR PHOTOGRAPHIC CAMERAS
Friedrich Papke, Braunschweig, Germany, assignor to
 Voigtlander A.G., Braunschweig, Germany
Filed Feb. 25, 1964, Ser. No. 347,182
Claims priority, application Germany, Feb. 28, 1963,
V 23,717
8 Claims. (Cl. 88—1.5)

ABSTRACT OF THE DISCLOSURE

A camera viewfinder for imaging frame limits at infinity. The viewfinder has a housing provided with a rear wall formed with a window through which the operator can look into the viewfinder. A pair of concave semi-transparent reflectors which are symmetrically situated with respect to the optical axis of the viewfinder are situated forwardly of and directed toward the rear of the viewfinder and respectively have focal planes situated rearwardly of the reflectors. A pair of spaced frame limit sections are situated on opposite sides of the rear window of the viewfinder respectively at the focal planes of the concave reflectors to be imaged thereby at infinity, and the concave reflectors respectively have optical axes which are inclined with respect to the optical axis of the viewfinder and which converge toward the subject which is sighted through the viewfinder. The pair of spaced frame limit sections respectively at the focal planes of the concave reflectors can be in the form of highly reflecting frame limits illuminated through light entering through windows situated laterally beyond the reflectors or the frame limit sections may themselves be in the form of images situated at flat reflectors which are at the focal planes, respectively, and in either case the imaging provided by the concave reflectors combines the images in the viewing field of the viewfinder into a single frame limiting image.

The present invention relates to photographic apparatus.

More particularly, the present invention relates to viewfinders which are used with photographic apparatus, such as cameras, to enable the operator to view the subject which is to be photographed before the film is exposed.

Modern viewfinders are required to do much more than simply enable the operator to view the subject which is to be photographed. Thus, it is required to provide in the viewing field of the viewfinder an image of the limits of the area of the viewing field which will be reproduced in the photograph, and in addition it is often desired to also be able to see in the viewfinder scales, pointers, signals, and other indicia which provide the operator with information with respect to the operation of the camera.

In order to project an image of the frame limits into the viewing field, there are three principal types of structures:

One type of structure for providing an image of frame limits provides the finder with a real image of the frame limits, and with a structure of this type it is necessary to situate the frame limits in the plane of the real image.

A second type projects an image of the frame limits into the field of the viewfinder from an area displaced from the viewfinder itself, the image of the frame limits being directed into the viewfinder by lenses as well as, generally, a pair of reflectors one of which is semi-transparent and extends across the optical axis of the viewfinder, so that the rays which direct an image of the frame limits into the viewfinder can be laterally offset from the viewfinder itself.

The third well known type of structure for providing frame limits in the field of the viewfinder is to be found in the Albada type of viewfinder provided with semi-transparent concave reflectors at the focal plane of which the framing limits, which are to be reflected into the viewfinder, are arranged around the optical axis of the viewfinder.

All of the above types of viewfinders have certain disadvantages inherent in their constructions.

The first type of viewfinder mentioned above, which provides a real image, requires that the image be inverted and laterally reversed so that it will appear right side up and properly oriented from side to side, and such structures require for this purpose usually prisms which are so expensive that they are generally to be found only in relatively expensive reflex cameras or in relatively expensive viewfinder accessories which are mounted on cameras.

The type of viewfinder which projects into the viewfinder an image of framing limits situated beyond the viewfinder has the disadvantage of requiring a relatively large amount of space. As a result they are generally included only in viewfinders which provide a reduction in the size of the image, this reduction often being as much as 0.4 with respect to the actual sizes, and even less in some cases. For an enlargement ratio of 1:1, it is required that additional expensive optical systems with prisms and several lenses be used.

The principal difficulty with Albada finders is that there is insufficient contrast between the image of the frame limits and the remainder of the image seen in the viewfinder. Furthermore, there are unavoidable reflections at the glass surfaces of the finder, and light which enters through the ocular of the finder reaches the semi-transparent reflectors and is reflected back from the latter to the eye of the operator in a disturbing manner. This last type of reflection is particularly noticeable to operators who wear glasses.

It is therefore a primary object of the present invention to avoid the drawbacks of all of the above viewfinders.

Thus, it is an object of the present invention to provide a viewfinder which is inexpensive, which will provide a sharp contrast between the frame-limiting image and the remainder of the image, which will not have undesirable reflections, and which will be highly compact so that it will not require a large amount of space, while at the same time providing a normal viewing angle with an enlargement ratio of approximately 1:1, so that the viewfinder of the invention will in fact fulfill the requirements all of which cannot be fulfilled by any one of the above-discussed types of viewfinders in a completely satisfactory manner.

In addition, it is an object of the present invention to provide a viewfinder which can accomplish the above objects and at the same time indicate to the operator information with respect to the operation of the camera.

A primary feature of the invention resides in providing a frame limiting means made up of a pair of sections which are separate from each other and in providing an imaging means which will image the frame limiting means at infinity in the viewing field of the viewfinder, this imaging means of the invention including a pair of concave semi-transparent reflectors which respectively image the sections of the frame limiting means in the viewing field in a manner which joins the section images to each other so as to form a complete unitary frame limiting image, and these concave semi-transparent reflectors of the invention are symmetrically arranged with respect to the optical axis of the viewfinder and respectively have optical axes which are inclined with respect to the optical axis of the viewfinder and which converge toward the subject which is sighted through the viewfinder.

The invention is illustrated by way of example in the accompanying drawings which form part of the application and in which.

Figure 1:
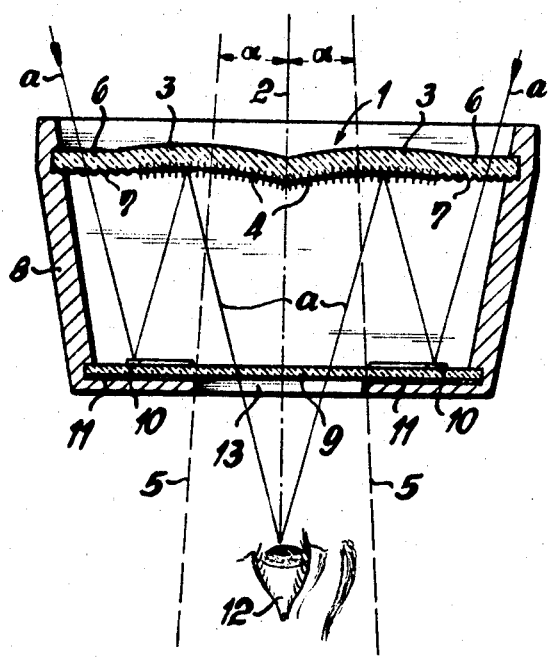
FIG. 1 is a sectional top plan view of a viewfinder according to the invention, the section of FIG. 1 being taken horizontally through the viewfinder.

The viewfinder which is illustrated in FIG. 1 includes a front wall 1 which may be made of glass but which is preferably made of a transparent plastic material. This front wall 1 is symmetrically constructed with respect to the optical axis and has on opposite sides of the optical axis a pair of sections which join each other at the optical axis 2 of the viewfinder. The front wall 1 may be a one piece construction although it can also be made of a pair of separate sections which are cemented together in a plane normal to that of FIG. 1 and including the optical axis 2. Each of the sections of the viewfinder includes a concave semi-transparent reflector 4 of the type used in viewfinders which operate on the Albada principle, and these semi-transparent reflectors are located at the inner surfaces of the portions 3 of wall 1 which have the configurations of meniscus lenses which bulge toward the subject which is viewed through the viewfinder. As will be apparent below, these semi-transparent reflectors 4 form part of an imaging means for imaging at infinity, in the viewing field of the viewfinder, the frame limiting means which is described below. The pair of semi-transparent reflectors 4 respectively have optical axes 5, which are symmetrically inclined with respect to the optical axis 2 of the viewfinder and which converge toward the subject which is viewed through the viewfinder, and in the illustrated example the optical axes 5 of the semi-transparent reflectors 4 respectively make angles α with respect to the optical axis. The particular size of the angles α is selected in designing the viewfinder and depends upon the size of the parts of the viewfinder and the desired viewing angle of the viewfinder.

The front wall 1 includes, beyond the meniscus portions 3 thereof, a pair of flat planar sections 6 which are joined to and extend laterally beyond the portions 3 adjacent opposed edges of the wall 1, and these transparent flat portions 6 of the wall 1 are not mirrored in any way. These flat transparent portions 6 of the front wall form windows through which light can enter into the interior of the viewfinder with practically undiminished intensity along the paths indicated by the lines a in FIG. 1. The inner surfaces 7 of the windows 6 are made of a roughened texture, for example, so that the light is diffused by these surfaces 7, and, as described below, the framing limits are highly reflecting so that with the practically undiminished light which enters through the windows 6 they provide brilliant frame limiting images which contrast sharply with the remainder of the image seen in the viewfinder. The windows 6 are preferably formed in one piece with the meniscus wall portions 3 which carry the semi-transparent reflecting layers 4, particularly when the front wall 1 is made of a plastic material. However, the windows 6 may be made as separate elements which are cemented to the sides of the meniscus portion 3 so as to be united therewith. These windows 6 are not mirrored in any way, as indicated above but are instead provided at their inner surfaces with the light diffusing texture 7 which may be provided by matting, pocking, or by forming tiny closely spaced grooves at the surface 7 similar to the grooves of Fresnel lenses.

The viewfinder housing 8 carries the front wall 1 in a conventional manner. The rear end of the housing 8 carries a rear wall 9 which, at its inner surface which is directed toward the interior of the viewfinder, supports sections 10 of the frame limiting means, at least approximately in the focal planes of the semi-transparent layers 4, these sections or frame limits 10 being separate and spaced from each other. The frame limiting means of course will provide the operator with an image of the limits of the area of the viewing field which will be reproduced in a photograph, and with the arrangement of the invention a pair of identical frame limiting sections 10, 10 are carried by the inner surface of the rear wall 9 substantially at the focal planes of the semi-transparent reflectors 4. Thus, according to the imaging of the frame limting means at infinity by the pair of semi-transparent reflectors 4, these sections 10 of the frame limiting means have a configuration which upon being imaged join each other to form a single unitary complete frame limiting image in the viewing field of the viewfinder. The wall 9 is darkened at least in the regions of the frame limiting sections 10 so as to avoid undesired reflections, and this darkening may take the form of coatings of black lacquer 11 covering rear surface portions of the rear wall 9. The wall 9 covers an opening 13, at the rear of the housing 8, through which the operator looks into the viewfinder so as to see the image of the frame limiting sections 10 provided by the semi-transparent reflectors 4, and these sections 10 of course are in the form of uniform halves of the frame limiting structure so that when they are identically imaged by the semi-transparent reflectors 4 they will join each other to form a single frame limiting image, as pointed out above.

The light which enters into the viewfinder along the path a, as indicated schematically, is reflected by the framing limit sections 10, and it will be noted that this light comes from beyond the subject which is being viewed and is reflected by the framing limit sections 10 in a manner similar to the manner in which such limits reflect light in Albada finders, and in this way the light reflected by the frame limiting means 10 reaches the semi-transparent dished reflectors 4 which provide a collimated image of the frame limits which appears to the eye to be at infinity, the eye 12 of the operator being indicated in FIG. 1.

Figure 2:
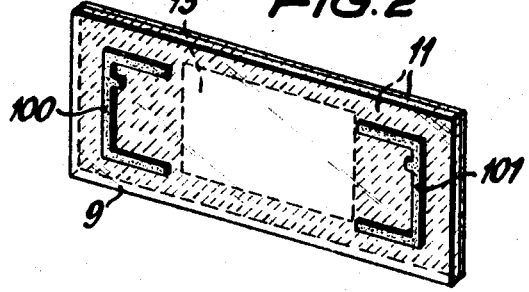
FIG. 2 is a perspective illustration of one embodiment of a rear wall of the viewfinder.

In FIG. 2 the rear wall 9 is illustrated in greater detail. It is made of flat glass or plastic. The sections of the frame limiting means 10 consists of a pair of framing portions 100 and 101 which are provided on the inner surface of the wall 9 by vapor deposition, by embossing or engraving, by spraying, or the like. In the region of these frame limiting sections the rear side of the wall 9 is darkened as by the layer of lacquer 11, as indicated above, and it is possible to provide a lacquer layer 11 which covers the entire rear surface of the wall 9 except the part thereof which is visible through the ocular opening 13, so that in this way the lacquer layer 11 itself will define the window through which the operator looks into the viewfinder. It is possible also to use for the rear wall 9 a plate which is opaque and on which the frame limiting sections are mounted. In order to be able to look into the viewfinder with such construction, however, it is necessary to provide a special window 13 which is transparent and situated at the central portion of the otherwise opaque plate.

Figure 3:
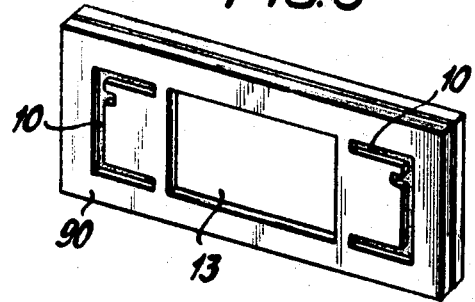
FIG. 3 is a perspective illustration of another embodiment of a rear wall of the viewfinder.

On the other hand, the framing limits can have the construction shown in FIG. 3 where the framing limits are carried by a metal plate 90 which is very highly reflecting as by being polished or the like, and which by well known printing or etching processes is darkened in such a way that only the frame limits 10 remain highly reflecting while the remainder of the plate, except for the window 13, is blacked out. Instead, an opaque mask can be mounted on the highly reflecting metal plate and provided with cutouts which expose the highly reflecting surface of the metal plate only at areas which conform to the confiuration of the framing limits. Of course, such a mask also would be formed with a central cutout which provides the window 13, as indicated in FIG. 3.

Figure 4:
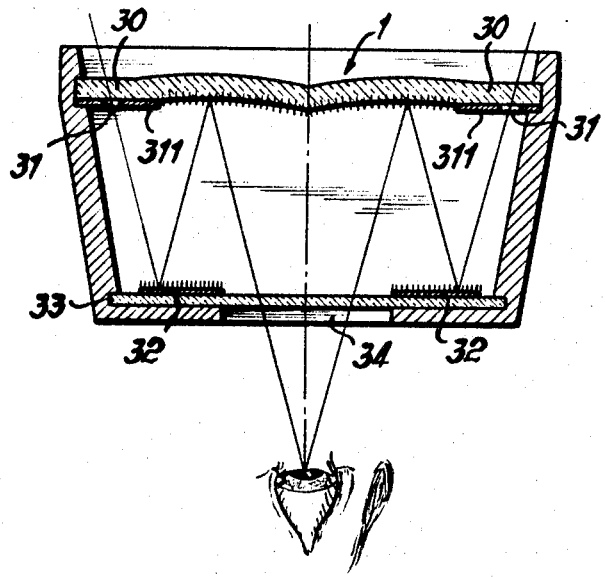
FIG. 4 is a sectional plan view of another embodiment of a viewfinder according to the invention, the section of FIG. 4 also being taken in a horizontal plane through the viewfinder.

Another embodiment of the present invention is illustrated in FIG. 4. With this construction the framing limits are not formed of a reflecting material and are themselves in the form of images at the rear wall 33 of the viewfinder. The frame limiting sections are formed by cutouts 31 which pass through the opaque elements 311 which cover the lateral windows 30 of the front wall 1, these windows 30 forming an illuminating means corresponding to the windows 6 described above and the covering elements 311 are located at the inner surfaces of these windows 30 and may take the form of coatings of opaque material or layers of masking material joined to the interior surfaces of the windows 30 and formed with the cutouts 31 which have the configuration of the framing limits. Thus, the framing limits in this case are located at the inner surfaces of the transparent, unmirrored windows 30 of the front wall 1. In this way the light which enters into the viewfinder will pass only through the cutouts 31 which have the configuration of the framing limits. The rear wall 33 of the viewfinder carries on opposite sides of the ocular opening 34 a pair of simple flat reflectors 32 of the frame limiting means which reflect images of the cutouts 31 to the concave semi-transparent reflectors which are identical with those described above in connection with FIG. 1. Thus, with this embodiment the frame limits at the focal planes of the semi-transparent reflectors are themselves in the form of images at the reflectors 32 situated at the rear wall of the viewfinder housing, while the sections of the frame limit means includes the masks 311 and the illuminating means is formed by the windows 30 which direct light through the cutouts 31 of the masks to provide the image-form of frame limits at the focal planes of the semi-transparent reflectors, respectively. Except for these differences the structure of FIG. 4 is the same as that of FIG. 1.

Figure 5:
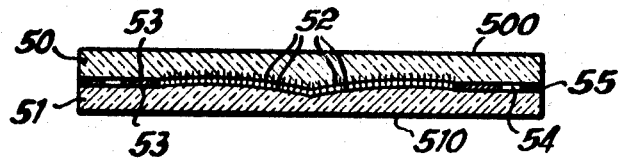
FIG. 5 is a sectional illustration of another embodiment of a front wall assembly of the viewfinder.

FIG. 5 shows another construction of a front wall of the viewfinder. Instead of the structure shown in FIGS. 1 and 4, where the front wall itself has the dished configuration of the semi-transparent reflectors, the front wall assembly of FIG. 5 includes a pair of transparent glass or plastic bodies 50 and 51 which are cemented to each other with a transparent cement and which have flat exterior surfaces 500 and 510, respectively. However, these bodies are formed at their cement surfaces with configurations which provide the concave surfaces 52 which carry the semi-transparent reflecting layers so that the semi-transparent concave reflectors of this embodiment are situated between the bodies 50 and 51 which at their portions which extend laterally beyond the semi-transparent reflectors form the windows through which light enters into the viewfinder. Between these lateral portions of the bodies 50 and 51, which extend beyond the reflectors are located a pair of masks 55 joined to the flat inner surfaces 53 of the bodies 50 and 51 and formed with the cutouts 54 which have the configuration of the framing limits, the masks 55 of course being opaque. Of course, this construction corresponds to the embodiment of FIG. 4 in that the light which passes through the cutouts 54 will be refleced by reflectors 32 back to the concave semi-transparent reflectors. However, the embodiment of FIG. 5 can be made to correspond to FIG. 1 simply by providing at the surfaces 53 suitable matting, grooving, pocking, or the like so that the front wall of FIG. 5 will also diffuse the light which enters through the lateral windows into the interior of the viewfinder.

Figure 6:
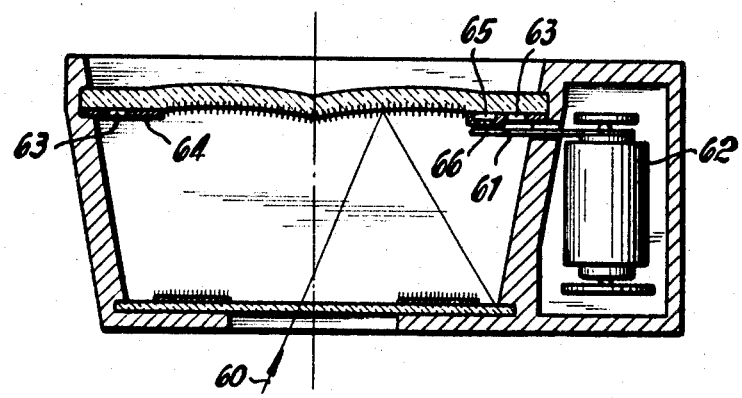
FIG. 6 illustrates how the viewfinder of FIG. 4 may be modified to include structure for indicating to the operator information with respect to the operation of the camera.

FIG. 6 shows how a viewfinder according to the invention can readily be adapted, according to a further feature of the invention, to provide information with respect to the operation of the camera. The embodiment of FIG. 6 includes, in the illustrated example, the viewfinder structure of FIG. 4 which is therefore not described in detail. However, in connection with the viewfinder structure of the invention, FIG. 6 does illustrate how a light ray 60 entering through the ocular into the viewfinder will not provide any undesired reflection to disturb the operator. With conventional viewfinders of the Albada type such rays would be reflected to the eye of the operator and would provide an undesired brightening of the field of the viewfinder.

There is shown in FIG. 6 a pointer 61 of a lightmeter which includes, for example, the galvanometer 62. The masks 64 of FIG. 6 correspond to the masks 311 of FIG. 4, and in fact the left mask of 64 of FIG. 6 is identical with the left mask 311 of FIG. 4, and both of the masks of FIG. 6 are provided with cutouts 63 identical with the cutouts 31 so as to form the framing limits.

The pointer 61 of the lightmeter passes through a suitable cutout in the right wall of the viewfinder housing to which an additional housing for the lightmeter is joined, and this pointer is free to move beneath the right mask 64 which in this case is widened and is provided with additional cutouts 66 which can, if desired, provide an area where a scale 65 is situated, so as to cooperate with the lightmeter pointer 61 in order to indicate light values or simply in order to render visible to the operator the extent of the deflection of the pointer. Also, the pointer 61 and the scale 65 as well as the frame 63 are reflected into the field of the viewfinder in the manner described above. In an analogous manner it is possible to accommodate in the space where the pointer of the lightmeter is located an additional follow-up pointer manipulated during setting of the camera, in a well known manner, so that when it reaches a position matching the position of an index or another pointer, such as the lightmeter pointer, the operator will know that the camera has been set to make a proper exposure for the prevailing lighting conditions.

Thus, it will be seen that the structure of the invention does indeed provide a simple and inexpensive viewfinder of compact construction enabling the operator to be provided with an image of framing limits which is bright and which contrasts sharply with the remainder of the viewed image. The images of the two sections of the framing limits are joined to each other to provide the operator with a single frame limiting image at infinity in the field of the viewfinder, because of the inclination of the optical axes 5 which converge toward the subject. Moreover, these inclinations of the optical axes of the semi-transparent reflectors enable the frame limiting sections to be situated beyond the window through which the operator looks into the viewfinder. Furthermore, it is apparent from FIG. 6 that the inclination of the optical axes the semi-transparent reflectors deflect extraneous light rays, such as the light rays 60, so that they do not provide undesired reflections. Thus, the viewfinder of the invention has the same highly desirable properties with respect to elimination of undesired reflections as the two-axis finders of known construction where the framing limits are situated beyond the viewfinder and reflected into the viewfinder by a separate structure situated beyond the viewfinder. However, the viewfinder of the invention differs from this latter type of finder in that it requires much less space and optical elements while at the same time it has practically the same construction as an Albada finder. Moreover, the finder of the invention can have a relatively large viewing angle and operates in a manner which is quasi-panoramic. All of the above advantages are combined without in any way undesirably influencing the effectiveness with which the optical elements operate to provide a frame limiting image in the field of the viewfinder.

While specific embodiments of the invention have been shown and described in detail to illustrate the application of the principles of the invention, it will be understood

What is claimed is:

1. In a viewfinder for photographic apparatus, a viewfinder housing having a rear end formed with a window through which the operator looks into said housing, frame limiting means carried by said housing for indicating to the operator the limits of the area of the viewing field which will be reproduced in a photograph, said frame limiting means having a pair of separate sections which are spaced from each other; illuminating means carried by said housing for illuminating said frame limiting means, and imaging means for imaging said frame limiting means at infinity in the viewing field of the viewfinder, said imaging means including a pair of concave semi-transparent reflectors situated forwardly of and directed toward said rear end of said viewfinder housing, symmetrically arranged with respect to the optical axis of the viewfinder, respectively having focal planes situated rearwardly of said reflectors and respectively having optical axes which are inclined with respect to the viewfinder optical axis and which converge toward the subject which is sighted through the viewfinder, said sections including a pair of spaced frame limits located respectively at said focal planes, and said concave reflectors respectively imaging said frame limits at infinity and uniting their images in the viewing field of the viewfinder into a single frame limiting image.

2. In a viewfinder as recited in claim 1, said illuminating means including a pair of transparent windows arranged beyond said semi-transparent reflectors closely adjacent thereto with said semi-transparent reflectors located between said pair of windows.

3. In a viewfinder as recited in claim 4, said windows respectively having light-diffusing surfaces directed toward the interior of the viewfinder.

4. In a viewfinder, a viewfinder housing having a front end to be directed toward the subject which is to be viewed and a rear end to be directed toward the eye of the operator; a rear wall carried by said housing at said rear end thereof and formed with a window through which the operator can look into the viewfinder; frame limiting means for indicating to the operator the limits of the area of the viewing field which will be reproduced in a photograph, said frame limiting means including a pair of sections separate and spaced from each other and carried by said rear wall beyond and respectively on opposite sides of said window; illuminating means carried by said housing for illuminating said frame limiting means; and imaging means for providing an image of said limiting means at infinity in the viewing field of the viewfinder, said imaging means including a pair of concave semi-transparent reflectors symmetrically arranged with respect to the optical axis of the viewfinder, situated forwardly of and directed toward said rear wall, respectively having focal planes situated rearwardly of said reflectors, and respectively having optical axes which are inclined with respect to the axis of the viewfinder and which converge toward the subject which is sighted through the viewfinder, said sections being respectively situated at said focal planes to be imaged by said reflectors at infinity and said sections of said frame limiting means being highly reflecting, said rear wall being dark and substantially non-reflecting at least in the regions where said sections of said frame limiting means are located so as to prevent undesired reflections.

5. In a viewfinder, a front transparent wall having on opposite sides of and relatively distant from the optical axis of the viewfinder a pair of windows respectively located adjacent opposed edge portions of said wall and through which light can freely pass into the interior of the viewfinder; frame limiting means for indicating to the operator the limits of the area of the viewing field which will be reproduced in a photograph, said frame limiting means having a pair of sections separate and spaced from each other and respectively located at the inner surfaces of said windows which are directed toward the interior of the viewfinder, said sections of said frame limiting means respectively including opaque portions respectively fixed to said inner surfaces of said windows and respectively formed with cutouts having the configuration of said limits and through which light freely passes into the interior of the viewfinder; imaging means for imaging said frame limiting means at infinity in the viewing field of the viewfinder, said imaging means including a pair of concave semi-transparent reflectors symmetrically carried by said front wall between said windows and symmetrically arranged with respect to the optical axis of the viewfinder, and said semi-transparent reflectors respectively having optical axes symmetrically inclined with respect to the optical axis of the viewfinder and converging toward the subject which is sighted through the viewfinder; and a rear viewfinder wall having a window through which the operator looks into the viewfinder, said concave reflectors being directed toward said rear wall and said frame limiting means including a pair of reflectors carried by said rear wall on opposite sides of said window, located at focal planes of said semi-transparent reflectors, respectively, and receiving light which passes through said cutouts of said opaque portions to provide at said focal planes, respectively, frame limit images which form limits which are themselves imaged by said imaging means at infinity.

6. In a viewfinder, a front wall having opposed transparent portions distant from and symmetrically arranged with respect to the optical axis and forming windows through which light enters into the viewfinder; a rear wall formed with a window through which the operator looks into the viewfinder; frame limiting means for indicating to the operator the limits of the area of the viewing field which will be reproduced in a photograph, said frame limiting means having a pair of sections separate and spaced from each other and respectively illuminated by light which enters through said windows; imaging means for imaging said frame limiting means at infinity in the viewing field of the viewfinder, said imaging means including a pair of concave semi-transparent reflectors symmetrically arranged with respect to the optical axis and carried by said front wall between said windows, said reflectors being directed toward said rear wall and respectively having focal planes in which said sections of said frame limiting means are respectively located, said semi-transparent reflectors respectively having optical axes inclined with respect to the optical axis of the viewfinder and converging toward the subject which is sighted through the viewfinder to unite images of said sections at infinity in the viewing field of the viewfinder into a single frame limiting image; and indicating means located at one of said windows for indicating to the operator information with respect to the operation of the camera which carries the viewfinder.

7. In a viewfinder, a transparent front wall having distant from and symmetrically arranged with respect to the optical axis a pair of opposed transparent windows through which light enters into the viewfinder; a rear wall formed with a window through which the operator looks into the viewfinder; frame limiting means for indicating to the operator the limits of the area of the viewing field which will be reproduced in a photograph, said frame limiting means including a pair of separate, spaced sections, and said sections of said frame limiting means respectively including a pair of masks respectively carried by said windows at inner surfaces thereof which are directed toward the interior of the viewfinder and respectively formed with cutouts the configuration of which form the frame limits, one of said masks being formed with at least one additional cutout indicating at least in part information with respect to the operation of the camera; imaging means for imaging said frame limiting means at infinity in the viewing field of the viewfinder, said imaging means including a pair of concave semi-transparent reflectors symmetrically arranged with respect to the viewfinder optical axis between said windows and carried by said front wall, said reflectors being directed toward said rear wall and respectively having focal planes situated at said rear wall, said frame limiting means including reflectors respectively situated at said focal planes for receiving images of said cutouts to provide at said focal planes frame limits in the form of said cutout images, said reflectors respectively having optical axes which are inclined with respect to the optical axis of the viewfinder and which converge toward the subject which is sighted through the viewfinder to unite the images of said frame limits at said focal planes into a single frame limit image at infinity; and indicating means extending into the interior of the viewfinder and cooperating with said additional cutout of said one mask for indicating information with respect to the operation of the camera.

8. The combination of claim 2 and wherein said frame limits at said focal planes are respectively in the form of portions of light-reflecting material.

No references cited.

JEWELL H. PEDERSEN, *Primary Examiner.*

O. B. CHEW, *Assistant Examiner.*